US008973072B2

(12) United States Patent
Julia et al.

(10) Patent No.: US 8,973,072 B2
(45) Date of Patent: Mar. 3, 2015

(54) SYSTEM AND METHOD FOR PROGRAMMATIC LINK GENERATION WITH MEDIA DELIVERY

(75) Inventors: Luc E. Julia, Emeryville, CA (US); Boris Henriot, Oakland, CA (US); Maklouf Serghine, Newark, CA (US)

(73) Assignee: QUALCOMM Connected Experiences, Inc., San Diego, CA (US)

( * ) Notice: Subject to any disclaimer, the term of this patent is extended or adjusted under 35 U.S.C. 154(b) by 1781 days.

(21) Appl. No.: 11/875,824

(22) Filed: Oct. 19, 2007

(65) Prior Publication Data

US 2008/0127289 A1 May 29, 2008

Related U.S. Application Data

(60) Provisional application No. 60/862,206, filed on Oct. 19, 2006.

(51) Int. Cl.
*H04N 7/173* (2011.01)
*H04N 21/436* (2011.01)
*H04N 21/4786* (2011.01)
*H04N 21/4788* (2011.01)
*H04N 21/858* (2011.01)

(52) U.S. Cl.
CPC ..... *H04N 7/17318* (2013.01); *H04N 21/43615* (2013.01); *H04N 21/4786* (2013.01); *H04N 21/4788* (2013.01); *H04N 21/8586* (2013.01)
USPC .............................. 725/112; 725/91; 725/109

(58) Field of Classification Search
USPC ........................................... 725/91, 112, 109
See application file for complete search history.

(56) References Cited

U.S. PATENT DOCUMENTS

| 5,034,807 | A | 7/1991 | Von Kohorn |
| 5,132,992 | A | 7/1992 | Yurt et al. |
| 5,253,275 | A | 10/1993 | Yurt et al. |
| 5,550,863 | A | 8/1996 | Yurt et al. |
| 5,661,516 | A | 8/1997 | Carles |
| 5,719,786 | A | 2/1998 | Nelson et al. |
| 5,774,170 | A | 6/1998 | Hite et al. |
| 5,831,664 | A | 11/1998 | Wharton et al. |

(Continued)

FOREIGN PATENT DOCUMENTS

| WO | WO 00/13688 A1 | 3/2000 |
| WO | WO 01/31852 A1 | 5/2001 |

(Continued)

OTHER PUBLICATIONS

U.S. Appl. No. 09/304,973, filed May 4, 1999, Balassanian.

(Continued)

*Primary Examiner* — Ricky Chin
(74) *Attorney, Agent, or Firm* — Mahamedi Paradice LLP

(57) ABSTRACT a media file is electronically communicated by programmatically generating a link for an electronic communication, where the link identifies a media file that is stored on a given terminal of a user. Selection of the link at a remote terminal is detected, indicating that a recipient of the electronic communication has selected to view the media file. In response to the link in the message being selected from the remote terminal, streaming data from the media file to the recipient. An embodiment such as described may be performed from a user terminal or system, correspond to, for example, where the media file was recorded, created and/or stored.

14 Claims, 8 Drawing Sheets

(56) References Cited

U.S. PATENT DOCUMENTS

| | | |
|---|---|---|
| 5,966,653 A | 10/1999 | Joensuu et al. |
| 6,002,720 A | 12/1999 | Yurt et al. |
| 6,101,534 A | 8/2000 | Rothschild |
| 6,144,702 A | 11/2000 | Yurt et al. |
| 6,157,621 A | 12/2000 | Brown et al. |
| 6,161,133 A | 12/2000 | Kikinis |
| 6,209,132 B1 | 3/2001 | Harrison et al. |
| 6,212,282 B1 | 4/2001 | Mershon |
| 6,263,503 B1 | 7/2001 | Margulis |
| 6,263,505 B1 | 7/2001 | Walker et al. |
| 6,310,886 B1 | 10/2001 | Barton |
| 6,312,336 B1 | 11/2001 | Handelman et al. |
| 6,327,608 B1 | 12/2001 | Dillingham |
| 6,349,410 B1 | 2/2002 | Lortz |
| 6,424,998 B2 | 7/2002 | Hunter |
| 6,430,603 B2 | 8/2002 | Hunter |
| 6,430,605 B2 | 8/2002 | Hunter |
| 6,437,836 B1 | 8/2002 | Huang et al. |
| 6,466,203 B2 | 10/2002 | Van Ee |
| 6,466,971 B1 | 10/2002 | Humpleman et al. |
| 6,470,378 B1 | 10/2002 | Tracton et al. |
| 6,477,589 B1 | 11/2002 | Suzuki et al. |
| 6,496,122 B2 | 12/2002 | Sampsell |
| 6,545,722 B1 | 4/2003 | Schultheiss et al. |
| 6,567,984 B1 | 5/2003 | Allport |
| 6,605,038 B1 | 8/2003 | Teller et al. |
| 6,611,863 B1 | 8/2003 | Banginwar |
| 6,629,163 B1 | 9/2003 | Balassanian |
| 6,670,974 B1 | 12/2003 | McKnight et al. |
| 6,718,551 B1 | 4/2004 | Swix et al. |
| 6,742,022 B1 | 5/2004 | King et al. |
| 6,754,904 B1 * | 6/2004 | Cooper et al. ................ 725/32 |
| 6,754,907 B1 | 6/2004 | Schumacher et al. |
| 6,757,684 B2 | 6/2004 | Svendsen et al. |
| 6,757,906 B1 | 6/2004 | Look et al. |
| 6,763,226 B1 | 7/2004 | McZeal, Jr. |
| 6,825,858 B2 | 11/2004 | Sato |
| 6,826,589 B2 | 11/2004 | Berrada |
| 6,836,786 B1 | 12/2004 | Zoller et al. |
| 6,870,547 B1 | 3/2005 | Crosby et al. |
| 6,904,265 B1 | 6/2005 | Valdivia et al. |
| 6,928,490 B1 | 8/2005 | Bucholz et al. |
| 6,956,833 B1 | 10/2005 | Yukie et al. |
| 6,957,086 B2 | 10/2005 | Bahl et al. |
| 6,959,235 B1 | 10/2005 | Abdel-Malek et al. |
| 6,968,179 B1 | 11/2005 | De Vries |
| 6,975,836 B2 | 12/2005 | Tashiro et al. |
| 7,010,002 B2 | 3/2006 | Chow et al. |
| 7,065,778 B1 | 6/2006 | Lu |
| 7,072,388 B2 | 7/2006 | Blakeney et al. |
| 7,089,066 B2 | 8/2006 | Hesse et al. |
| 7,098,772 B2 | 8/2006 | Cohen |
| 7,127,261 B2 | 10/2006 | Van Erlach |
| 7,130,582 B2 | 10/2006 | Barilovits |
| 7,165,224 B2 | 1/2007 | Pyhalammi |
| 7,177,872 B2 | 2/2007 | Schwesig et al. |
| 7,177,881 B2 | 2/2007 | Schwesig et al. |
| 7,188,312 B2 | 3/2007 | Hsiu-Ping et al. |
| 7,209,817 B2 | 4/2007 | Abdel-Malek et al. |
| 7,213,061 B1 | 5/2007 | Hite et al |
| 7,213,766 B2 | 5/2007 | Ryan et al. |
| 7,219,136 B1 | 5/2007 | Danner et al. |
| 7,233,990 B1 | 6/2007 | Debaty et al. |
| 7,246,009 B2 | 7/2007 | Hamblen et al. |
| 7,260,600 B1 | 8/2007 | Dunn et al. |
| 7,263,352 B2 | 8/2007 | Neuhaus et al. |
| 7,271,780 B2 | 9/2007 | Cok |
| 7,275,063 B2 | 9/2007 | Horn |
| 7,280,533 B2 | 10/2007 | Khartabil et al. |
| 7,284,046 B1 | 10/2007 | Kreiner et al. |
| 7,325,057 B2 | 1/2008 | Cho et al. |
| 7,328,173 B2 | 2/2008 | Taratino et al. |
| 7,360,087 B2 | 4/2008 | Jorgensen et al. |
| 7,363,258 B2 | 4/2008 | Svendsen et al. |
| 7,376,696 B2 | 5/2008 | Bell et al. |
| 7,376,901 B2 | 5/2008 | Shen et al. |
| 7,379,464 B2 | 5/2008 | Kreiner et al. |
| 7,379,986 B2 | 5/2008 | Kikinis |
| 7,468,744 B2 | 12/2008 | Edwards et al. |
| 7,487,112 B2 | 2/2009 | Barnes, Jr. |
| 7,502,795 B1 | 3/2009 | Svendsen et al. |
| 7,519,393 B2 | 4/2009 | Bahl et al. |
| 7,526,314 B2 | 4/2009 | Kennedy |
| 7,561,299 B2 | 7/2009 | Elarde et al. |
| 7,617,279 B2 | 11/2009 | Nakajima et al. |
| 7,724,281 B2 | 5/2010 | Vale et al. |
| 2001/0045985 A1 | 11/2001 | Edwards et al. |
| 2001/0052019 A1 * | 12/2001 | Walters et al. ................ 709/231 |
| 2001/0052942 A1 | 12/2001 | MacCollum et al. |
| 2001/0053274 A1 | 12/2001 | Roelofs et al. |
| 2002/0002707 A1 | 1/2002 | Ekel et al. |
| 2002/0010925 A1 | 1/2002 | Kiknis et al. |
| 2002/0026507 A1 | 2/2002 | Sears et al. |
| 2002/0041398 A1 | 4/2002 | Ikeda et al. |
| 2002/0046406 A1 | 4/2002 | Chelehmal et al. |
| 2002/0056112 A1 | 5/2002 | Dureau et al. |
| 2002/0069309 A1 | 6/2002 | Balassanian |
| 2002/0100063 A1 | 7/2002 | Herigstad et al. |
| 2002/0105534 A1 | 8/2002 | Balassanian |
| 2002/0108125 A1 | 8/2002 | Joao |
| 2002/0124258 A1 | 9/2002 | Fritsch |
| 2002/0131072 A1 | 9/2002 | Jackson |
| 2002/0162120 A1 | 10/2002 | Mitchell |
| 2002/0188556 A1 | 12/2002 | Colica et al. |
| 2002/0188867 A1 | 12/2002 | Bushey et al. |
| 2003/0048295 A1 | 3/2003 | Lilleness et al. |
| 2003/0063770 A1 | 4/2003 | Svendsen et al. |
| 2003/0065407 A1 | 4/2003 | Johnson et al. |
| 2003/0093791 A1 | 5/2003 | Julia |
| 2003/0093813 A1 | 5/2003 | Shintani et al. |
| 2003/0115284 A1 | 6/2003 | Henry |
| 2003/0118014 A1 | 6/2003 | Iyer et al. |
| 2003/0146977 A1 | 8/2003 | Vale et al. |
| 2003/0157960 A1 | 8/2003 | Kennedy |
| 2003/0192054 A1 | 10/2003 | Birks et al. |
| 2003/0208472 A1 | 11/2003 | Pham |
| 2003/0220835 A1 | 11/2003 | Barnes |
| 2003/0220995 A1 | 11/2003 | Hitaka et al. |
| 2003/0229667 A1 | 12/2003 | Pedersen et al. |
| 2004/0004663 A1 | 1/2004 | Kahn et al. |
| 2004/0004737 A1 | 1/2004 | Kahn et al. |
| 2004/0015589 A1 | 1/2004 | Isozu |
| 2004/0015820 A1 | 1/2004 | Balassanian |
| 2004/0044723 A1 | 3/2004 | Bell et al. |
| 2004/0045039 A1 | 3/2004 | Harrison et al. |
| 2004/0049624 A1 | 3/2004 | Salmonsen |
| 2004/0060071 A1 | 3/2004 | Shteyn |
| 2004/0066419 A1 | 4/2004 | Pyhalammi |
| 2004/0097251 A1 | 5/2004 | Barilovits |
| 2004/0097259 A1 | 5/2004 | Toor et al. |
| 2004/0100974 A1 | 5/2004 | Kreiner et al. |
| 2004/0103313 A1 | 5/2004 | Kreiner et al. |
| 2004/0103437 A1 * | 5/2004 | Allegrezza et al. ............. 725/95 |
| 2004/0117442 A1 | 6/2004 | Thielen |
| 2004/0117845 A1 | 6/2004 | Karaoguz et al. |
| 2004/0117846 A1 | 6/2004 | Karaoguz et al. |
| 2004/0117849 A1 | 6/2004 | Karaoguz et al. |
| 2004/0133694 A1 | 7/2004 | Karaoguz et al. |
| 2004/0139172 A1 | 7/2004 | Svendsen et al. |
| 2004/0148353 A1 | 7/2004 | Karaoguz et al. |
| 2004/0172440 A1 | 9/2004 | Nakajima et al. |
| 2004/0177319 A1 | 9/2004 | Horn |
| 2004/0205168 A1 | 10/2004 | Asher |
| 2004/0221163 A1 | 11/2004 | Jorgensen et al. |
| 2004/0236442 A1 | 11/2004 | Maymudes |
| 2004/0237122 A1 | 11/2004 | Yamaguchi et al. |
| 2004/0250205 A1 | 12/2004 | Conning |
| 2004/0267873 A1 | 12/2004 | Shen et al. |
| 2005/0002640 A1 * | 1/2005 | Putterman et al. ............. 386/46 |
| 2005/0005025 A1 | 1/2005 | Harville et al. |
| 2005/0021624 A1 | 1/2005 | Herf et al. |
| 2005/0028208 A1 | 2/2005 | Ellis et al. |
| 2005/0037706 A1 | 2/2005 | Settle |
| 2005/0038923 A1 | 2/2005 | Kamataki |

(56) References Cited

U.S. PATENT DOCUMENTS

| | | | |
|---|---|---|---|
| 2005/0052469 A1 | 3/2005 | Crosby et al. | |
| 2005/0055455 A1 | 3/2005 | Asher | |
| 2005/0055716 A1 | 3/2005 | Louie et al. | |
| 2005/0062695 A1 | 3/2005 | Cok | |
| 2005/0076058 A1 | 4/2005 | Schwesig et al. | |
| 2005/0083904 A1 | 4/2005 | Khartabil et al. | |
| 2005/0107031 A1 | 5/2005 | Wood et al. | |
| 2005/0136949 A1 | 6/2005 | Barnes, Jr. | |
| 2005/0138560 A1* | 6/2005 | Lee et al. | 715/719 |
| 2005/0153707 A1 | 7/2005 | Ledyard et al. | |
| 2005/0171661 A1 | 8/2005 | Abdel-Malek et al. | |
| 2005/0171692 A1 | 8/2005 | Hamblen et al. | |
| 2005/0172001 A1 | 8/2005 | Zaner et al. | |
| 2005/0183120 A1* | 8/2005 | Jain et al. | 725/46 |
| 2005/0198040 A1 | 9/2005 | Cohen et al. | |
| 2005/0198222 A1 | 9/2005 | Kohinata et al. | |
| 2005/0201358 A1 | 9/2005 | Nelson et al. | |
| 2005/0201529 A1 | 9/2005 | Nelson et al. | |
| 2005/0215194 A1 | 9/2005 | Boling et al. | |
| 2005/0223409 A1 | 10/2005 | Rautila et al. | |
| 2005/0229243 A1 | 10/2005 | Svendsen et al. | |
| 2005/0232186 A1 | 10/2005 | Karaoguz et al. | |
| 2005/0234864 A1 | 10/2005 | Shapiro | |
| 2005/0235048 A1 | 10/2005 | Costa-Requena et al. | |
| 2005/0240558 A1 | 10/2005 | Gil et al. | |
| 2005/0242971 A1 | 11/2005 | Dryer | |
| 2005/0246757 A1 | 11/2005 | Relan et al. | |
| 2005/0256934 A1 | 11/2005 | Motoyama | |
| 2005/0259618 A1 | 11/2005 | Ahya et al. | |
| 2005/0283731 A1 | 12/2005 | Saint-Hilaire et al. | |
| 2005/0286497 A1 | 12/2005 | Zutaut et al. | |
| 2005/0289266 A1 | 12/2005 | Illowsky et al. | |
| 2006/0010255 A1 | 1/2006 | Van Berkel et al. | |
| 2006/0010270 A1 | 1/2006 | Zhang | |
| 2006/0015649 A1 | 1/2006 | Zutaut et al. | |
| 2006/0015664 A1 | 1/2006 | Zhang | |
| 2006/0020960 A1 | 1/2006 | Relan et al. | |
| 2006/0026271 A1 | 2/2006 | Julia et al. | |
| 2006/0047843 A1 | 3/2006 | Julia et al. | |
| 2006/0080452 A1 | 4/2006 | Julia et al. | |
| 2006/0085826 A1* | 4/2006 | Funk et al. | 725/87 |
| 2006/0092176 A1 | 5/2006 | Wang et al. | |
| 2006/0095401 A1 | 5/2006 | Krikorian | |
| 2006/0095471 A1 | 5/2006 | Krikorian | |
| 2006/0095472 A1 | 5/2006 | Krikorian | |
| 2006/0161635 A1 | 7/2006 | Lamkin et al. | |
| 2006/0238335 A1 | 10/2006 | Karaoguz et al. | |
| 2006/0248554 A1 | 11/2006 | Priddy | |
| 2006/0253542 A1 | 11/2006 | McCausland et al. | |
| 2006/0253894 A1 | 11/2006 | Bookman et al. | |
| 2006/0256130 A1 | 11/2006 | Gonzalez | |
| 2006/0268738 A1 | 11/2006 | Goerke et al. | |
| 2006/0277318 A1 | 12/2006 | Julia et al. | |
| 2006/0280157 A1 | 12/2006 | Karaoguz et al. | |
| 2006/0288095 A1 | 12/2006 | Torok et al. | |
| 2007/0027957 A1 | 2/2007 | Peters et al. | |
| 2007/0038771 A1 | 2/2007 | Julia et al. | |
| 2007/0061857 A1 | 3/2007 | Seki et al. | |
| 2007/0067407 A1* | 3/2007 | Bettis et al. | 709/207 |
| 2007/0078948 A1 | 4/2007 | Julia et al. | |
| 2007/0118535 A1 | 5/2007 | Schwesig et al. | |
| 2007/0118619 A1 | 5/2007 | Schwesig et al. | |
| 2007/0168543 A1 | 7/2007 | Krikorian et al. | |
| 2007/0173266 A1 | 7/2007 | Barnes | |
| 2007/0189476 A1 | 8/2007 | Marsico et al. | |
| 2007/0198532 A1 | 8/2007 | Krikorian et al. | |
| 2007/0207755 A1 | 9/2007 | Julia et al. | |
| 2007/0255785 A1* | 11/2007 | Hayashi et al. | 709/204 |
| 2007/0266169 A1* | 11/2007 | Chen et al. | 709/231 |
| 2007/0280138 A1 | 12/2007 | Stern | |
| 2008/0021921 A1 | 1/2008 | Horn | |
| 2008/0189766 A1 | 8/2008 | Bell et al. | |
| 2008/0232295 A1 | 9/2008 | Kreiner et al. | |
| 2008/0259818 A1 | 10/2008 | Balassanian | |
| 2008/0279098 A1 | 11/2008 | Park | |
| 2010/0017462 A1* | 1/2010 | Thoen | 709/203 |
| 2010/0180307 A1 | 7/2010 | Hayes et al. | |
| 2010/0186034 A1* | 7/2010 | Walker | 725/40 |

FOREIGN PATENT DOCUMENTS

| | | |
|---|---|---|
| WO | WO 01/33839 A1 | 5/2001 |
| WO | WO 03/052552 A2 | 6/2003 |
| WO | WO 2005/122025 A2 | 12/2005 |
| WO | WO 2006/010023 A2 | 1/2006 |

OTHER PUBLICATIONS

U.S. Appl. No. 09/498,016, filed Feb. 4, 2000, Balassanian.

U.S. Appl. No. 10/118,587, filed Apr. 8, 2002, Balassanian.

U.S. Appl. No. 60/341,574, filed Dec. 17, 2001, Balassanian.

U.S. Appl. No. 60/341,932, filed Dec. 18, 2001, Balassanian.

U.S. Appl. No. 60/577,833, filed Jun. 7, 2004, Krikorian.

Citrix, Winview for Networks, Installation Guide. 320pages, 1990-1994.

Discover Desktop Conference with NetMeeting 2.0, by Mike Britton and Suzanne Van Cleve. 305pages, 1997.

Final Office Action mailed Oct. 17, 2008 for US 2007/0207755 (U.S. Appl. No. 11/538,800) 16 pgs.

Final Office Action for U.S. Appl. No. 10/888,745 mailed Sep. 2, 2008, 28 pages.

Final Office Action for U.S. Appl. No. 10/888,633 mailed Sep. 3, 2008, 25 pages.

Final Office Action for U.S. Appl. No. 11/531,182 mailed Aug. 31, 2010.

Final Office Action mailed Jul. 9, 2009 for U.S. Appl. No. 11/244,424 18 pages.

Final Office Action mailed Apr. 6, 2010 for U.S. Appl. No. 11/422,419, 9 pages.

Final Office Action for U.S. Appl. No. 10/006,914 mailed Oct. 18, 2006, 15 pgs.

Final Office Action mailed Mar. 15, 2010 for U.S. Appl. No. 11/538,800, 14 pages.

Final Office Action for U.S. Appl. No. 10/006,914 mailed Feb. 4, 2008, 18 pgs.

Final Office Action for U.S. Appl. No. 10/006,914 mailed Jun. 22, 2009, 30 pgs.

Final Office Action for U.S. Appl. No. 10/888,606 mailed May 26, 2010, 36 pgs.

Final Office Action for U.S. Appl. No. 10/888,745 mailed May 20, 2010.

Final Office Action for U.S. Appl. No. 10/888,633 mailed Aug. 17, 2010.

Goldberg, et al., The Ninja Jukebox, conference proceedings from the 2nd USENIX Symposium on Internet Technologies and Systems, Oct. 11-14, 1999, pp. 37-46, Boulder, Colorado.

International Search Report and Written Opinion of the International Searching Authority for PCT/US05/24324 mailed Jul. 20, 2007.

Network, The Authoratative Dictionary of IEEE Standards Terms, 7th Edition 2000.

Non-Final Office Action for U.S. Appl. No. 10/888,633 mailed Jan. 9, 2008, 18 pages.

Non-Final Office Action for U.S. Appl. No. 10/006,914 mailed Jun. 12, 2007, 20 pgs.

Non-Final Office Action for U.S. Appl. No. 10/006,914 mailed Sep. 10, 2008, 23 pgs.

Non-Final Office Action for U.S. Appl. No. 10/888,745 mailed Feb. 12, 2008, 15 pages.

Non-Final Office Action mailed Nov. 30, 2009 for U.S. Appl. No. 10/888,633, pp. 20.

Non-Final Office Action for U.S. Appl. No. 10/006,914 mailed Jan. 26, 2006, 8 pgs.

Non-final Office Action mailed Sep. 15, 2008 for US 2006/0277318 (U.S. Appl. No. 11/244,424) 17 pgs.

Non-Final Office Action mailed Dec. 23, 2009 for U.S. Appl. No. 11/531,182, pp. 16.

Non-Final Office Action mailed Jun. 9, 2009 for U.S. Appl. No. 11/538,800, pp. 13.

(56) References Cited

OTHER PUBLICATIONS

Non-final Office Action mailed Jan. 17, 2008 for US 2007/0207755 (U.S. Appl. No. 11/538,800) 11 pgs.
Non-Final Office Action mailed Oct. 2, 2009 for U.S. Appl. No. 11/422,419, pp. 9.
Non-Final Office Action mailed Jun. 24, 2009 for U.S. Appl. No. 11/531,182, pp. 16.
Non-Final Office Action mailed Oct. 14, 2009 for U.S. Appl. No. 10/888,745, pp. 21.
Non-Final Office Action mailed Mar. 17, 2009 for U.S. Appl. No. 10/888,633, pp. 29.
Non-Final Office Action mailed Aug. 4, 2009 for U.S. Appl. No. 10/888,606, 24 pages.
Non-Final Office Action mailed Nov. 10, 2009 for U.S. Appl. No. 10/006,914, 24 pages.
Non-Final Office Action for U.S. Appl. No. 11/244,424 mailed May 7, 2010.
Path Construction for Multimedia Applications, website material from: bnrg.cs.berkeley.edu/~zmao/cs294-1/multimediaReport.doc, circa Oct. 1999.
TV Brick Home Server, web site as of Dec. 2, 2003, <http://www.tvbrick.com>, provided by <http://archive.org> 4 pages.
TV Brick Home Server, web site as of May 20, 2004, <http://www.tvbrick.com>, provided by <http://archive.org> 4 pages.
TV Brick Home Server, web site as of Jul. 1, 2004, <http://www.tvbrick.com>, provided by <http://archive.org> 4 pages.
TV Brick Home Server, web site as of Jun. 12, <http://www.tvbrick.com>, provided by <http://archive.org> 4 pages.
TV Brick Home Server, web site as of Jun. 9, 2004, <http://www.tvbrick.com>, provided by <http://archive.org> 4 pages.
TV Brick Home Server, web site as of Jun. 8, 2004, <http://www.tvbrick.com>, provided by <http://archive.org> 4 pages.
TV Brick Home Server, web site as of May 25, 2004, <http://www.tvbrick.com>, provided by <http://archive.org> 4 pages.
TV Brick Home Server, web site as of May 8, 2004, <http://www.tvbrick.com>, provided by <http://archive.org> 4 pages.
TV Brick Home Server, web site as of Apr. 7, 2004, <http://www.tvbrick.com>, provided by <http://archive.org> 4 pages.
TV Brick Home Server, web site as of Mar. 22, 2004, <http://www.tvbrick.com>, provided by <http://archive.org> 4 pages.
TV Brick Home Server, web site as of Feb. 10, 2004, <http://www.tvbrick.com>, provided by <http://archive.org> 4 pages.
TV Brick Home Server, web site as of Dec. 28, 2003, <http://www.tvbrick.com>, provided by <http://archive.org> 4 pages.
TV Brick Home Server, web site as of Oct. 9, 2003, <http://www.tvbrick.com>, provided by <http://archive.org> 4 pages.
TV Brick Home Server, web site as of Jul. 19, 2003, <http://www.tvbrick.com>, provided by <http://archive.org> 4 pages.
TV Brick Home Server, web site as of Jul. 4, 2003, <http://www.tvbrick.com>, provided by <http://archive.org> 4 pages.
TV Brick Home Server, web site as of Jun. 29, 2003, <http://www.tvbrick.com>, provided by <http://archive.org> 4 pages.
TV Brick Home Server, web site as of Feb. 3, 2004, <http://www.tvbrick.com>, provided by <http://archive.org> 4 pages.
TV 'brick' opens up copyright can of worms, by Benoit Faucon, The Wall Street Journal (from Australian Financial Review) Jul. 1, 2003, published online Oct. 20, 2003 on http://mex-at-the-blogspot.com/search?q=brick, 1 page.

\* cited by examiner

508

SYSTEM AND METHOD FOR PROGRAMMATIC LINK GENERATION WITH MEDIA DELIVERY

RELATED APPLICATIONS

This application claims benefit of priority to Provisional U.S. Patent Application No. 60/862,206, filed Oct. 19, 2006, entitled "Media Delivery System and Method for Transporting Media to Desired Target Devices"; the aforementioned priority application being hereby incorporated by reference in its entirety and for all purposes.

TECHNICAL FIELD

Embodiments of the invention relate a system and method for enabling the communication of media files. In particular, embodiments described herein provide a system and method for programmatic link generation with media delivery.

BACKGROUND

Email, text messaging and other forms of electronic communication have continued to grow in popularity as more and more devices are able to connect to the internet. Over the years, network connectivity has been extended to appliances such as refrigerators, home entertainment centers, and interactive box sets for use with television sets, digital cameras, and cell phones. With the evolution of these devices, there have been developments in home networks. For example, WIFI technology enables users to interconnect various network enabled devices wirelessly to form their own local area network. Various services and applications currently exist with the goal of establishing data connectivity between different network locations. The growth of the Internet and other types of networks has contributed to the numerous networking applications that currently exist.

Electronic messaging and networking capabilities have been extended to a number of portable devices including cell phones, personal digital assistants (PDAs), and personal computers. As these devices continue to evolve, electronic messages including email, text messages and instant messages may be transmitted between these web-enabled devices. However, sending a video message or other form of media data between these devices using email or other form electronic messaging is still relatively impractical as many media files may be too large to send using convention forms of electronic messaging. In addition, many devices that have capabilities to interact with networks and receive and send electronic messages, often have poor user-interface features, and limited processing/memory resources for receiving and playing back media files that are transmitted and received.

Additionally, there are various interoperability issues when different types of network enabled devices are coupled and media files are sent between devices. Often, the different devices operate on incompatible platforms or operating systems. This can cause problems in how these devices share data with one another. Furthermore, connected devices may use different data types (.WAV versus MPEG) and/or data formats that hinder the user's ability to share media files amongst devices. As an example, the size of the screen display on a cell phone is typically too small to render images from a digital camera, even if the cell phone is camera-enabled. Often, the result is that when users want to share data amongst connected devices, that user must perform numerous manual steps, such as manually converting data formats.

Even as various computer and electronic devices increase their functionality, their hardware components, environment and form-factor become limitations that need to be accounted for when devices are sought to operate with one another. For example, many devices are capable of rendering or playing back rich media (e.g. music or video), but these devices have different levels of suitability for these functions and most times large media files may not be transmitted to and stored by these devices.

DETAILED DESCRIPTION

Figure 1:
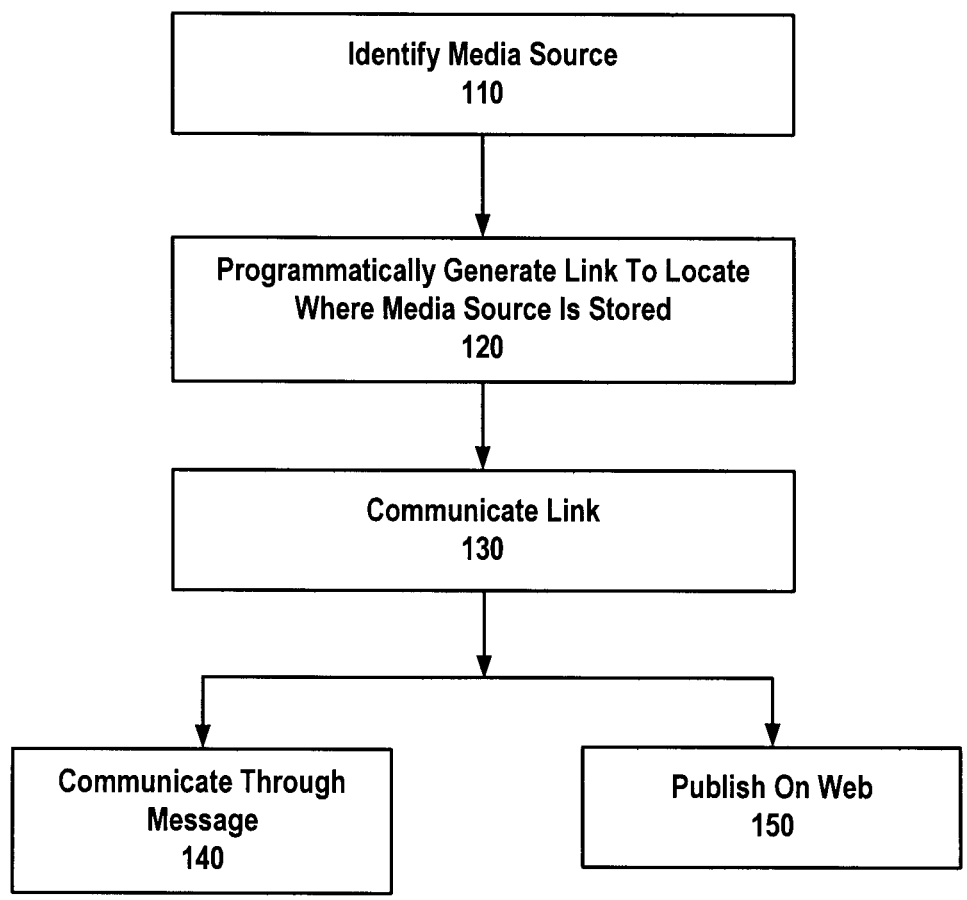
FIG. 1 describes a method or technique for communicating a link that identifies a media file to a third party

Embodiments described herein provide a method and system for enabling the programmatic transmission of media files through programmatic and/or automatic link generation. According to some embodiments, a method is provided for generating a selectable link for electronic communications (e.g. email or blog post), where the link locates and identifies a media file on a user's system, home network or so-called personal network. In one embodiment, individuals are able to share media that they host by communicating a link to that media, and enabling recipients of the link to access a corresponding media file to receive the media. As will be described, the link may be shared by electronic communication, including by messaging or by web posting.

In one embodiment, a media file may be created concurrently or contemporaneously with the composition of an electronic message that includes a link to locate that media file. For example, the media file may be recorded by the user and transmitted during the composition of the electronic message. Individuals who receive the message are able to select the link from a connected terminal. The link identifies a stored media file associated with the link, and causes portions of the stored media file to be transferred to a target device (device on which the link was selected).

According to embodiments described herein, communications that include links may be in the form of messages (e.g. emails) or web postings. For example, an individual may record a video file containing a personal message, store the message locally, and communicate a message (email, MMS, SMS, instant message etc.) containing a link to either the media file or a mirror to the media file.

As an alternative, the media file that is the subject of the communication may have been previously recorded or obtained (e.g. through a third party source). The media file may reside on the user's terminal or network (e.g. home network or personal network), and a link may be generated that enables a recipient of the link to receive media corresponding to the media file. (home or personal).

Embodiments described herein provide that when a media file is generated or selected by an individual, a link, corresponding to the identified media file, is generated and included in an electronic message or web posting. As used herein, a link is a selectable data element that can, either by itself, or with a combination of other data, enable a recipient user to remotely locate the media file, or a replication or similar resource of the media file. The link may serve to directly or indirectly locate the media file. Furthermore, the link may be automatically or manually included in the body of an electronic message or blog in response to some designated event, action or combination of events/actions. For example, the link may be programmatically generated in response to completion of a media recording, or the completion of a media recording in combination with a message being open or otherwise under a state of composition.

Embodiments described herein provide that when a media file is generated or selected by an individual, a link, corresponding to the identified media file, is generated and included in an electronic message or web posting or other electronic communication. As used herein, a link is a selectable data element that can, either by itself, or with a combination of other data, enable a user to remotely access a resource. When selected, a link may operate to identify a corresponding resource either directly or indirectly. The link may be automatically or manually included in the body of an electronic message or blog.

According to an embodiment, a media file is electronically communicated by programmatically generating a link for an electronic communication, where the link identifies a media file that is stored on a given terminal of a user. Selection of the link at a remote terminal is detected, indicating that a recipient of the electronic communication has selected to view the media file. In response to the link in the message being selected from the remote terminal, streaming data from the media file to the recipient. An embodiment such as described may be performed from a user terminal or system, correspond to, for example, where the media file was recorded, created and/or stored.

According to another embodiment, in response to a media recording event by a user, a link is generated for a web posting. The link identifies a media file that is stored on a given terminal of the user, and the media file includes data from the media recording event. The link is provided at a web page, and selection of the link from a remote terminal is detected. In response to the selection, data from the media file is streamed to the recipient.

Still further, an embodiment provides a software system that is executable on a computing device. The system includes a component that is configured to interface with a messaging application that is usable on or from the computing device. Additionally, the component is configured to (i) identify a media file selected by a person composing a message; (ii) generate a link for a message, wherein the link identifies a stored media file for a message; and (iii) automatically include the link in the message.

Under one embodiment, when an electronic communication is sent (e.g. message or a web post), the identified media file is securely transferred to either the composer's home computer or to a specified server on a user defined network. Thus, for example, the media file may be moved on recording to a location in a user's domain where other recipients of the link can obtain remote access.

As an alternative or option, the media file, or its copy, may automatically be moved offsite from the user's domain, particularly on a selective basis. For example, in the case where a user's media link on a web page becomes popular, the media file may automatically be moved offsite to a storage location where access to that media file is more readily available to the public.

Still further, one embodiment provides that a messaging application may be combined or operated with a plug-in application to communicate with a system that generates and includes the link into the message.

An embodiment such as described may be performed programmatically, or as a computer-implemented method. Programmatically means through the execution of code, or computer-executable instructions.

As used herein, a plug-in corresponds to an application that operates in connection with another application. In general, a plug-in is a smaller version of the application that is operated with, and resides as an application-layer program.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 describes a method or technique for programmatically generating a link to a media resource and enabling the link to be available to a user at a destination that is remote to the media resource, under an embodiment of the invention. A method such as described with FIG. 1 may be used to enable a person at a remote destination to access media stored on another person's system or network.

Alternatively, such a method may be used to enable the provider of the link to specify media stored remotely from the link provider's system or network. The media file may be stored locally on a user's defined network, device, or computer system, or may be stored remotely on a server. According to one or more embodiments, a user can specify a media file that is stored on (i) the user's personal computer or computing device, (ii) the user's home network (i.e. on an appliance or terminal on the home network), (iii) the user's satellite or location on a personal network, such as described with U.S. Pat. No. 8,819,140, and/or (iv) on an Internet account or third-party network location.

Step 110 provides that a media file is identified for link generation. The media file may be in the process of being created, newly created (e.g. user stops recording a video file), or existing. Such a step may be performed manually, as in the case of a user may selecting a media file from his personal library. Alternatively, an embodiment provides that the step is performed automatically, such as in response to the user initiating or completing a recording of a video clip. According to one or more embodiments, a user can specify a media file that is stored on (i) the user's personal computer or computing device, (ii) the user's home network (i.e. on an appliance or terminal on the home network), (iii) the user's satellite or location on a personal network, such as described with U.S. patent application Ser. No. 10/888,606, U.S. Pat. No. 8,819, 140, and/or (iv) on an Internet account or third-party network location. The identification may be made at either the time when the media file is created (e.g. during a live digital recording), or anytime after the media file has been stored. The identified media file may be in the form of audio, video, or a combination thereof. The media file may be in any one of various formats such as .MP3, .WAV, .MPEG, .MOV, .AVI, etc. For example, the media file identified may be a .MOV file stored on the user's personal computer, or on a device (e.g. camera, memory card) attached to the user's computer. Alternatively, the identified media file may be a digital video file that is in the process of being recorded by a audio/video capturing device.

In step 120, a link is programmatically generated that can be used by software running at a remote destination to identify and locate the identified media file. The link may correspond to a selectable data structure that can cause a program or resource using the link to access a particular network location. The network location may correspond to a source where the media file identified by the link resides, or the location of another terminal or server that has access to the media file. Still further, as described with an embodiment, the link may be selected to cause the resource that uses the link to indirectly access the media resource through one or more computers that mediate communications between the terminal on which the link was selected and the computer(s) that provide the media from file located by the link.

In one implementation, the link may be a data structure that specifies an address of the identified media file, such as a uniform resource locator (URL) or a portion thereof. As an example, step 120 may generate a URL which identifies the selected media file regardless of whether the file is stored remotely or locally. The URL may be generated regardless of whether the media file is currently being recorded or has been stored for a period of time. As mentioned, step 120 may alternatively generate a partial URL, or another form of identifier. For example, the link may communicate a file that can be selected on one terminal, and replaced or combined with an address on another terminal or server. Likewise, another implementation may provide the link is a partial URL or address (or other form of an identifier), which is completed on a server or terminal that is remote to the terminal where the link is received and selected.

In step 130, the link generated in step 120 may be communicated using an electronic medium. Sub-steps 140 and 150 describe different communication mechanisms that may be used to transfer or make the link usable from a remote location. The link may be communicated either through (i) an electronic message such as email, text messages, instant messages and the like, (ii) be published on a web-page, message board, or blog, or (iii) a combination of both. The communication may be intended for the public at large or select individuals or terminals.

In one embodiment, the link may be included in the body of an email. The individual composing the email message may choose close friends or family to receive the email message containing the generated link. However, if the link was generated for use on a web-page, blog, or message board, the individual composing the message may have no control over who views the posting and selects the link. Still further, the user may operate a server type software on a terminal from which the media file is provided. An example of such software is available at www.orb.com. Such software (or other similar applications) may cause selective distribution of the generated link (e.g. to those that the content provider selects), or the software may restrict who has access to the identified media file by checking to ensure the terminal/person making the link selection is authorized.

In sub-step 140, the link may be communicated to one or more remote destination by message delivery. The electronic message may be in the form of an email, short message service (SMS) or multimedia messaging service (MMS). According to an embodiment, once the media file has been identified, and the link generated, the link may be automatically included into the body of the electronic message. In one embodiment, plug-in for a messaging application may be used to automatically incorporate the link into the body of the electronic message. The plug-in may automatically include the link in the message at the time the link is generated or when the message is sent by the messaging application (e.g. the individual clicks "send"). Thus, the link may be automatically created with media file identification (step 110) and then included in the body of the email as one step, at least to the perspective of the user. Alternatively, the link may be manually placed in the body of the message by the individual composing the message. According to an embodiment, the link may be included, either automatically or manually, in the electronic message regardless of the type of messaging application or service being used (e.g. client-based email application, Internet email, Instant Messaging applications, SMS or MMS messages).

In an embodiment, when the link has been included in the message, the messaging application may then transmit the message containing the link to an intended recipient. In one implementation, the message is an email, and the user may provide a subject line and/or additional text. The user may perform a transmission action (e.g. click the send button) once the link is inserted, although alternative implementations may provide that the transmission action is automatically performed after the media file that is to be transmitted is identified.

On the receiving end, the message and link may be received by any web enabled device, including cell phones, personal digital assistants (PDA's), and personal computers. As described below, subsequent media delivery may be configured on-the-fly, from either a point of transmission of the media, or from an intermediary web service, to format the media for the receiving device. Thus, the link may be selectable regardless of the device on which the message is received. Once the link is communicated by the user, and the recipient selects the link through an application (such as a messaging application or web browser), portions of the media file that correspond to the link are transmitted (e.g. streamed) to the target device. The media may be configured to accommodate the target device, taking into account factors that include one or more of the following: (i) the platform that the target device uses, (ii) the application that is to render the media file, and the data format that the application can handle, (iii) hardware limitations or characteristics of the receiving device, including screen size and processing capabilities, and (iv) bandwidth available for the receiving device to receive media. The configurations required may be determined programmatically and automatically, just prior to the data from the media file being communicated to the receiving device.

As an alternative or addition to sub-step 140, sub-step 150 provides that the link is communicated by publishing the link on a web-page or web-site accessible by a web-browser. According to an embodiment, the link may be posted on a personal web-page, web log (blog), electronic message board, discussion board or other online forum. In an embodiment, an individual may create an entry for an online forum by selecting, identifying, or creating a media file to be included on the forum. According to an embodiment, the link may be automatically included when the media file has been identified/created by the user, or the link may be automatically included when the blog or web-page has been posted or published. The link may be included on the web-page or blog independent of the application used to create or publish the web-site, and regardless of the service hosting the blog site (e.g. www.myspace.com).

Various applications for embodiments described above are possible. In one scenario, a user creates a media file using a Universal Serial Bus (USB) video recorder that is connected to a terminal. The recording may be made as part of a messaging application. Thus, the user may interact with an interface created by, for example, a plug-in to a messaging application. When making the media file, the user may have a message in a state of composition, or alternatively a message selected for reply or forwarding action. Once the media file is created, the media file is stored on a user terminal, and a link to the file is automatically created. This link is then inserted into the message body of the email under composition. Alternatively, a new email may be created automatically, and the link is inserted into the body of the email (automatically or otherwise). The user can then perform a send action, or the send action may be performed immediately and automatically after the media file recording is complete.

In another scenario, the user may have a video clip in a media library on a terminal. The user may interface with a web publishing application or plug-in, which creates a link and publishes the link on a web page that is identified by the user.

Still further, the user may operate a cell phone or other roaming device and create a video clip from the phone's camera. The user may message (e.g. SMS or MMS) the clip to another phone or terminal. In one implementation, the clip on the phone may be transferred to an associated computer or account of the user, and the generated link may locate the clip on the associated computer or account.

As an alternative implementation, the link may be generated at a different location from where the media file is selected or created. For example, in the cell phone case described above, the user may send a video clip as an MMS message to a service, and the service then captures the video clip and forwards to one or more intended recipients a link to the video clip. The service may host the video clip. For example, the service may provide offsite broadband access to the video clip if the user's terminal has limited bandwidth, or if the video clip becomes popular.

Various alternatives, variations and/or combinations to embodiments and implementations described above are contemplated.

Link Generation and Media Delivery

Figure 2:
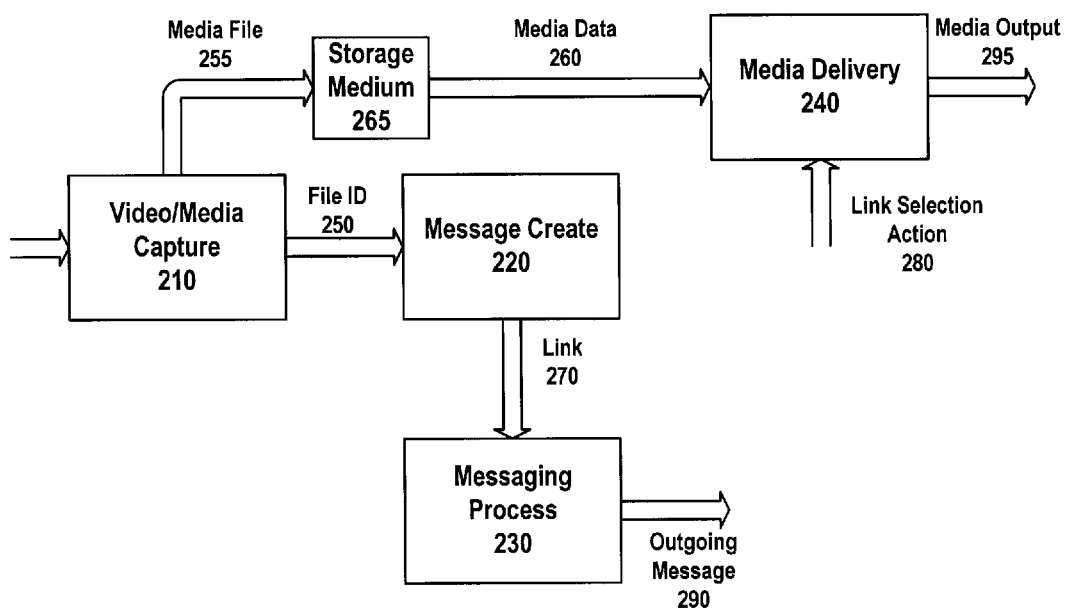
FIG. 2 is a basic block diagram of a system for transmitting a media file using an electronic message.

FIG. 2 is a block diagram of a system for programmatically generating a link to be automatically included in an electronic message. When the link is selected on a web-enabled target device, media data that is associated with the link may be streamed to the target device. A system such as described with FIG. 2 may be used to implement one or more embodiments, such as described with FIG. 1. A system of FIG. 2 reflects use of various processes that combine to perform stated tasks. Each of the processes may be implemented through modules, using one or more computers and at one or more logical or physical locations. Furthermore, the combination of processes may be performed together at one time, or over a duration. Additionally, the processes can be performed independent of one another, or dependently off of each other as part of a larger process flow.

Embodiments such as described with FIG. 2 provide a way in which a link, corresponding to an identified media file, may be automatically included in an electronic message. The electronic message, including the link, may then be transmitted to a receiving party. When the message is received, the receiving party may select the link that corresponds to the identified media source. Selection of the link causes portions of the identified media file to be transmitted to the target device. In an embodiment, the media file is not transferred and stored on the target device, only portions of the media file are transferred to the target device (e.g. streamed). Various aspects of the transmission may undergo configurations for optimal transmission and/or reception on the receiving device, including transfer rate and configurations to accommodate the resources of the receiving device. For example, the rate of transfer may depend on the speed at which the target device is able connect to the Internet or the rate at which data may be transferred and played back on the target device.

According to an embodiment, media may be generated or created using a device that enables video/media capture 210. The result of the capture process 210 is the creation of a media file 255. Examples of such devices include a video camera, digital video or media recorder, webcam, cell phone or PDA with video recording capabilities, or any other device on which media may be recorded and/or stored. According to an embodiment, the recorded media file may be in various types of formats. The media file may be stored at anytime during the recording process. Video/Media capture 210 may also enable an individual to select pre-recorded media files or other types of media files from third party sources (e.g. movie clip) that have been stored on a personal computer, server, or other storage medium.

In one embodiment, captured media is stored as the media file 255 in a storage medium 265 for subsequent use. The storage medium 265 may be permanent (e.g. on a hard drive in a media library) or temporary (e.g. in cache on a temporary folder). Still further, the storage may be local, on a user's personal or home network, or on a server that provides services in connection with embodiments described herein. In some cases, multiple storage locations may be preferred. For example, a storage server may be provided as part of a service to host a media file if the terminal is programmatically (or through user-selection) deemed inadequate to host requests for the media file. In the example, both the server and the user's home terminal may store the media file.

In an embodiment, message create 220 enables an individual to create an electronic message and generate a link 270 to include in the outgoing message 290. The link 270 in the outgoing message 290 identifies the media file 255 created or selected from video/media capture 210 by location or otherwise. In one embodiment, the link 270 identifies an address or path to the media file 255 in the storage medium 265. Message create 220 may allow any form of electronic messaging such as an email, text, message, or instant message. Message create 220 may use any number of third party messaging applications, such as, for example, Outlook or Outlook Express by MICROSOFT, Eudora by QUALCOMM, and other web-based electronic messaging applications including Gmail, Hotmail, Yahoo Mail, instant messenger, windows messenger or AIM. According to an embodiment, message create 220 may use a plug-in for the third party messaging application.

According to an embodiment, the plug-in performs some or all of the following: (i) open the third party messaging application if it is not in use at the time the message is being composed, (ii) provide an interface where a media file may be selected or generated, (iii) generate the link corresponding to the identified media file, and (iv) automatically include the link in the message. In one implementation, the message create 220 also causes the message to be sent or transmitted automatically upon completion of the media recording.

Message create 220 receives file ID 250 that corresponds to the media file 255 generated or identified by video/media capture 210. According to an embodiment, file ID 250 may be generated by the plug-in to the messaging application. Alternatively, file ID 250 may be the file name the media file 255 was given as it was created and stored. For example, an individual creating the media file 255 may have named the file "mymovie." In such a case, the file ID 250 would be "mymovie". The file ID 250 may also show the path of directories where the media file has been stored (e.g. D:\Media Files\mymovie). In an embodiment, file ID 250 may be used to complete the URL (or partial URL) or link 270 generated by a plug-in or link generator. Continuing with the example, a partial URL (step 120, FIG. 1) may have been generated. The file ID 250 associated with the selected media file (mymovie) may be used in the partial URL to create a complete URL or link. File ID 250 may identify the media file 255 in any stage of composition, including media files currently being generated, or a media file that has previously been created and stored by the user.

In one embodiment, the plug-in for an independent or third party messaging application may be used to communicate with a media delivery system. Selection of the plug-in may enable an individual to record a video message for an outgoing text message or email. When the recorded media file 255 has been created, the generated link may be placed in the body of the message. The recorded media file may then be transferred to a personal computer, server, or other storage device (in or outside of the user's domain) where it may be accessed through use of the link 270.

When message create 220 has been completed (e.g. the email or text message has been completed by an individual) the link 270 may be generated and included as part of an outgoing message 290. As mentioned with other embodiments, the message may be an email, instant message, SMS or MMS message or other form of asynchronous communication between two locations. The link 270 may be generated by either the plug-in or by an independent application ("link generator"). The resulting link 270 may then be transmitted to messaging process 230, which sends the outgoing message 290. According to an embodiment, link 270 identifies the media file 255 by location and/or by name. The identification may be made directly or indirectly (such as through an intermediary or trusted proxy web service).

Performance of messaging process 230 may result in the electronic message, in whatever form it may take (e.g. email, SMS) being transmitted to the designated recipient(s). The message 290 may include the link 270, a portion of the link 270, or a data structure corresponding to link 270. The message may be communicated to accounts (email), devices, terminals and/or other destinations.

A media delivery process 240 may execute at a later time to deliver media data 260 from the media file 255 to the terminal that received the message 290. The media delivery may be responsive to a link selection action 280. According to an embodiment, a link selection action 280 is an action performed by the recipient of the message. In this respect, the action 280 may be remote from the media delivery process 240 (i.e. on the receiving terminal), but communicated in the form of a request or other communication across a network to the location(s) where the media delivery process is performed. In one embodiment, link selection action 280 occurs when a recipient of the message selects the generated link 270 included in the body of the received message. Once the link 270 has been selected, media delivery process 240 accesses the media file 255 from the storage medium 265. Media delivery process 240 may then transmit data from the media file 255 to the target device where the link selection action 280 occurred. For example, the link 270 may be selected on a web-enabled target device, media delivery may then use link 270 to identify and locate the media file 255 on the storage medium 265. Upon identification of the media file 255, the media data 260 is streamed or otherwise transmitted to the target device by the media delivery process 240.

According to an embodiment, the identified media file 255 associated with the link is not transferred and stored on the target device. The media file 255 remains where it was originally stored and the media data is streamed to the destination. In one embodiment, the media delivery process 240 is provided by a client side server application that executes on a system of the user creating the message. An example of such an application is provided is provided as a download at www.orb.com. According to one or more embodiment, media delivery process 240 creates a media output 295 that is based on the media data 260. As described below, various functions may be performed by the media delivery process 240 on the media data 260 to generate the media output 295. The resulting media output 295 accounts for capabilities and resources available to the destination, including, for example, (i) the type of media player or browser in use at the device where the link selection action 280 was performed, (ii) the platform used by that device, (iii) the type of device (or device hardware capabilities) where the selection action 280 originated, and (iv) the available bandwidth for making the transmission. U.S. patent application Ser. No. 11/531,182, U.S. Pat. No. 8,787,164, entitled MEDIA DELIVERY SYSTEM AND METHOD FOR TRANSPORTING MEDIA TO A DESIRED TARGET, filed Sep. 12, 2006, (which is hereby incorporated in its entirety) provides description of a system that can execute to provide the media delivery process 240 may be executed to accommodate various resources and capabilities of the destination. Examples of accommodations that can be made by the media delivery process 240 for include (i) reducing stream size of media output 295 to accommodate bandwidth or processing resources, (ii) sizing image data as part of media output 295 to accommodate a display size on the receiving device, and (iii) formatting or reformatting the media output 295 to accommodate the media player, browser and/or platform on the destination device or site. To this end, the media delivery process 240 may perform functions that include (i) detecting or identifying pertinent capabilities and resources of the destination device, including one or more of network bandwidth, device type, platform, browser type, media player type and determining display size; (ii) reformatting media data 260 from a native format to a format that can be handled on the receiving device; (iii) resizing image data in media data 260; and/or (iv) reducing the transmission size (e.g. bit rate) of the media data 260 from its original size.

Still further, an embodiment provides that the media delivery process determines or otherwise identifies whether the terminal of the recipient includes a Digital Rights Management (DRM) engine. The determination of the DRM engine may influence or affect whether the media delivery takes place. Alternatively, the presence or type of DRM engine may affect the file format used and/or quality of the media that is delivered.

Figure 3:
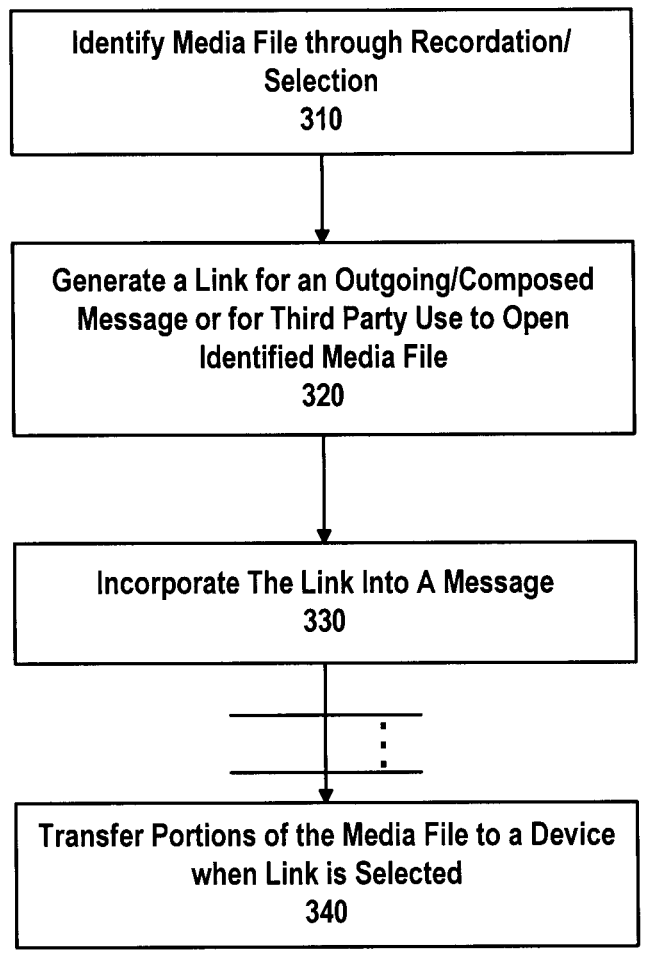
FIG. 3 describes a method or technique for identifying and electronically sending a media file.

As described with an embodiment of FIG. 3, the video capture process 210 may be optional, in that a user may select any media file for delivery in the manner stated.

FIG. 3 describes a method or technique for identifying and electronically transmitting a media file, according to one or more embodiments of the invention. A method such as described may be performed using a system such as described with FIG. 2.

In step 310, a media file is identified. According to an embodiment, the media file may be identified by an individual selecting a particular media file. Selection may consist of an individual selecting a prerecorded or stored media file. The media file may be stored remotely on a server or other storage device, or the media file may be stored locally on a personal computer. For example, an individual may use an application (e.g. windows explorer) to browse or search stored media files on the individual's personal computer. Alternatively, a similar application and link generation process may be used to browse or search for media files stored remotely on a server or other storage medium. Still further, the user may browse or select from a personal network, such as described in U.S. patent application Ser. No. 10/888,606, U.S. Pat. No. 8,819, 140, entitled "System and Method for Enabling the Establishment of a Personal Network," filed Jul. 9, 2000 (hereby incorporated by reference). A personal network may provide a shared or combined memory covering memory locations at various network locations, from which the user may select a particular media file.

As an alternative, a media file may be identified through recordation. Recordation may consist of an individual recording a media file specifically for an electronic message (e.g. email or text message) currently being composed by the individual. For example, the individual composing the electronic message may, through the use of a webcam or other media recordation device, record a media file for the specific purpose of including it in the message. In such a scenario, the identification may be automatic and instant upon the user completing the recording.

Step 320 provides that a link is generated for an outgoing message. According to an embodiment, the link may be programmatically generated when the media file is identified. As explained with an embodiment of FIG. 2, the link may include a file ID 250 that corresponds to the media file identified in step 310. Alternatively, a link may be generated independent of the file ID 250 but still be associated with the identified media file.

Step 320 may also generate a link corresponding to an identified media file for use in a third party application or internet site. For example, the link may be generated and included on a web-page, blog posting, or other web-based application. The link may also be included in a word document application, web publishing application or service, or spreadsheet application. A plug-in to various third party software applications may be used to select or record a media file and generate a link for inclusion in the document. For example, if an individual was using MICROSOFT Outlook, for composing a message, a plug-in may be used to select/record a media file and generate the link that will be included in the message. A message may be an electronic message or a posting on a blog, web-page or message board.

Step 330 provides that the generated link is incorporated into a message. According to an embodiment, the link may be automatically or manually included in the body of a message. This step may be preformed programmatically, automatically or manually. For example, if the messaging application is open and running on a device the link may be placed in the body of the message. Alternatively, an individual may interact with a user interface of a link generator as will be described below. In cases where a plug-in is used, the plug-in may open a messaging application, create a link, and include the link in the body of the message. In the case of a web-page publication or blog posting, the link may be incorporated into the text of the blog or web-page. As with a messaging application, a plug-in may also be used to identify a media file and generate the corresponding link.

According to an embodiment, the link may be included in the electronic message when the message is sent by the individual composing the message. For example, if a media file has been identified and the link has been generated, the link may not be included in the message until the individual chooses to send the message by clicking "send" in the messaging application. In the case of web-pages, blogs, word documents and so forth, the link may not be incorporated into the text of the blog or document until the page has been posted, saved, or published. In an alternative embodiment, the link may be incorporated into the message, document, or web-posting immediately after the link has been generated in step 320.

In step 340, portions of the identified media file are delivered for rending to a target device. According to an embodiment, the message containing the link may be sent to designated recipients. When a recipient of the message selects the link contained in the message, media data is transferred to the device. According to an embodiment, the media file is not transferred to the device, but the media data is streamed to the target device.

In an embodiment, when the media file is streamed to the target device, the media file may be formatted, so as to enable it to be displayed according to the target device's playback capabilities (e.g. screen size, resolution etc.) The media data may also be formatted to a type that is compatible with the media player on the target device.

For example, if the link identified a media file that was in a .MOV format and the recipient of the message receives the message on a web-enabled PDA with Windows Media Player (.WMV format), the media data being transferred/streamed to the PDA will be converted from .MOV format to .WMV format. In addition, the media file will be formatted so to fit the smaller display size and resolution of the PDA. U.S. patent application Ser. No. 11/531,182, U.S. Pat. No. 8,787, 164, entitled MEDIA DELIVERY SYSTEM AND METHOD FOR TRANSPORTING MEDIA TO DESIRED TARGET DEVICES, filed Sep. 12, 2006, which is incorporated by reference in this application, provides various descriptions on detecting capabilities of the receiving device and optimizing media delivery to the receiving device. The following paragraphs provide additional description of media delivery operations to make the media data transmission optimized, enabled or more conducive for use on the target device (the device that performs a selection operation on the link).

Data Reduction: If the media data being streamed to the target device has an inherently large transmission size, data reduction processes may be performed on the media data. The transmission size may correspond to a bit rate for the transmission. The bit rate is a function of a frame rate and picture quality. The bit rate is normally determined by the media source, which uses a high bit rate to improve picture quality and/or frame rate. The data reduction parameters may be set as one of preference or necessity. For example, in order to free network bandwidth, the user may have a preference as to lower transmission size. Additionally, the network bandwidth a device may need may be determined independent of the device's capabilities. Rather, the available bandwidth may be a function of the bandwidth on the communication channel to the device. In one embodiment, this profile information is determined programmatically, by sending a test message or communication to a specific target and measuring a response time. For example, an image or media clip may be transmitted periodically to the end target device from a component on the user's network system, and the component may measure the time it takes for a programmatic response or receipt to that message to be received back from the target. Based on response time, the profile information indicating bandwidth and/or data reduction parameters may be set.

Formatting: A determination may be made based on the target device's profile information to determine information about the data type of media that can be handled by the target device. For example, a profile for a target device may identify the type of media player (e.g. Windows Media Player) on the target device. The media data transmitted may not compatible with the media player on the target device. In such a case, formatting may be used to convert the transmitted media data into a format compatible with the media player on the target device. Implementation of the formatting process may correspond to identification of a specific process that converts the media data from its native format to another format suitable for consumption by the target device. For example, a process may be called to convert the media data from MOV to WMV.

Image Sizing: The media data may be inspected to determine whether image data is contained in the media data. If the media data has image data, profile information about the target device may be used to determine if any size constraints exist for the target device that is to receive the media data. For example, cellular phones have size limitations in their dimension and screen resolution. A determination may be made that the size of the image data portion of the media data needs to be resized in order to make the video or images of the media data compatible with the display hardware of the target device. In addition to size limitations, some target devices may have alternative size capabilities. For example, the device may have an elongated display and alternative display mode operations where the device may be operated in a landscape mode. The image data may resized to accommodate the landscape setting by extrapolating or stretching image data.

Link Generation and Media Delivery System

Figure 4:
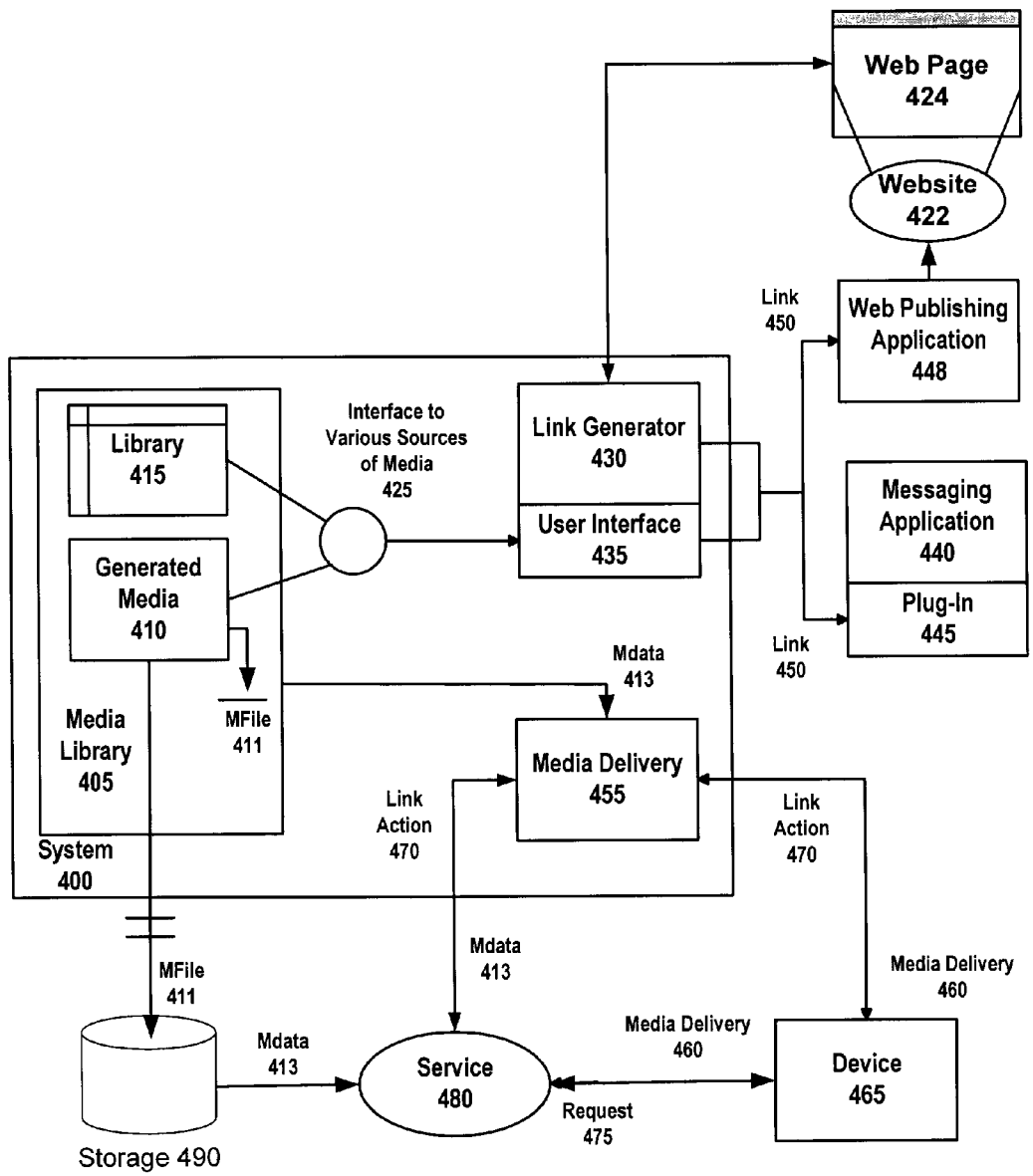
FIG. 4 illustrates a system architecture, under one or more embodiments of the invention.

FIG. 4 illustrates a system architecture for generating and using links, under one or more embodiments of the invention. According to an embodiment, system 400 may generate a link corresponding to an identified media file and then enable communication of that link through an electronic medium. System 400 includes a media library 405 that stores generated media 410 and/or media files stored in a database library 415. The system 400 also includes a link generator 430 and a media delivery sub-system 455. As described with one or more other embodiments, a user of system 400 may create a media file 411 that contains data corresponding to media recordings. In particular, an embodiment provides that the user can make available personal media recordings (e.g. recording video clip or video message) in the media file 411, although numerous other forms of media (whether generated, recorded, or stored) may be used with embodiments described herein.

In an embodiment, the media library 405 may include an interface 425 to various sources of media, so as to enable a user to browse or select a media file from the media library 405. The media library 405 may contain a generated media 410 directory to store media. Generated media 410 may also store media transferred from devices capable of recording and storing media (e.g. video camera) within or as part of media file 411. Media library 405 may also contain library 415. Library 415 may be a database of media files stored in media library 405, including media files generated from third party sources. For example, library 415 may have media files downloaded from the internet (e.g. movie clips, mp3s, or television shows), or media files uploaded from a source other than a video recording device. Media library 405 may be stored locally on a personal computer or other storage device that is at the location where the user resides. Still further, one or more alternative embodiments or implementations provide that the media library 405 is stored remotely on a server, accessible through a user defined network, or on an interconnected terminal or peer. As another alternative or addition, in another embodiment, the media library 405 provides a combined memory and corresponding view, as described with U.S. patent application Ser. No. 10/888,606, U.S. Pat. No. 8,819,140, entitled "System and Method for Enabling the Establishment of a Personal Network."

In an embodiment, interface 425 enables an individual to select a media file from media library 405. The interface 425 may enable an individual to either browse or search media library 405. Alternatively, the interface 425 may be provided by an independent application, such as a file manager of an operating system. For purpose of embodiments described below, the media file 411 is assumed selected, corresponding to media recorded (or in process of being recorded) from user action. For example, media file 411 may include data recording a live event in the presence of the user (e.g. the user pointing the video recorder to himself, or recording another event in his or her presence)

As described elsewhere, one or more embodiments provide that the link generator 430 may be operable to generate a link 450 corresponding to media file 411 on its creation. Link generator 430 may identify the network address of a computer or other device storing the identified media file 411, and use that address as a portion of the URL. Link generator 430 may also use part of the file name of the selected media file 411 to generate the link 450. Once generated, the link 450 can either by itself, or in combination with other data, locate the media file 411 from the media library 405.

In one implementation, link generator 430 may include a user-interface 435 to enable a user to select the media file 411 from other possible files in the library. The selection may result in the link 450 being programmatically generated. For example, the user may browse the media library 405 and select media file 411, then select a feature provided by the user-interface 435 (i.e. an icon) to cause the link generator 430 to be invoked. The link generator 430 may then automatically generate the link for the media file 411.

As an alternative or addition to the user-interface 435, the link generator 430 may be operable through execution of related programs. In one embodiment, a plug-in 445 for a messaging application 440 may invoke the link generator 430 when the plug-in is operated with the messaging application. Alternatively, the messaging application 440 may be configured to generate the link 450.

According to an embodiment, plug-in 445 may link the messaging application 440 to the link generator 430 and other components to enable programmatic link generation and link inclusion in outgoing messages (which may be e-mail, SMS, MMS or other transport). One implementation provides that plug-in 445 includes user-interface 435, so as to enable a user to select the media file 411 when the messaging application 440 has started. Plug-in 435 may also automatically include the link 450 into the body of the message being generated by messaging application 440. In another embodiment, plug-in 445 may open the messaging application if the application is closed, generate the link to be included in the message, and automatically include the link in the body of the outgoing message. In still another embodiment, plug-in 445 may enable an individual to generate media for the messaging application. For example, plug-in 445 may allow a user to access recordation device (e.g. webcam), connected to the system 400, and record a video message for a specific email currently being composed using messaging application 440. Once the media file has been generated, link generator 430 may generate link 450 and transmit it to plug-in 445. Plug-in 445 includes link 450 in the email message. Plug-in 445 may also allow an individual to manually include the link in the composed message. The recording may be stored in media file 411, and the link may identify the media file 411 to the recipient of the message.

As another alternative or addition, the link generator 430 may be invoked or otherwise used by a web publishing application 448, or by a plug-in (not shown) for the web publishing application 448. Usage from such an application may cause the resulting link 450 to be published on a blog or other web page. Web publishing application 448 may correspond to any web-page development program (e.g. Dreamweaver, Frontpage GoLive). Web publishing application 448 may alternatively be a third party service that hosts web-pages, blog sites (e.g. www.myspace.com), or other on-line mediums where media may be shared (e.g. www.youtube.com). In each of the above, link 450 may be included on the page, enabling a viewer of the page to select the link 450 and have the media streamed to the target device.

As an alternative or addition, the link generator 430 may generate the link 450 for web based electronic messages or posts. For example, the messaging application 440 may be a web-based email (e.g. such as GMAIL). The link generator 430, or a separate interface, may enable the link generator 430 to insert the link 450 to media file 411 in a web-based email or messaging application. Still further, the user may be able to upload the link 450 through a convention upload functionality provided on web pages. The link generator 430 may print the link 430 for the user to copy and paste into a post, or provide functionality to automate the insertion of the link into a web post. Thus, the link 450 may be communicated to, for example, a web page 424 hosted at a website 422 (e.g. user's personal blog) through either a client side application or through direct interface with the website or webpage.

As described with other embodiments, a media delivery process 455 is used once link 450 provided by the link generator 430 is selected from a remote terminal 465, where the remote terminal is operated by a recipient of the electronic communication. In the case where the electronic communication is in form of a message, the recipient may be the recipient of the message. In the case where the communication is a web page, the recipient may correspond to an individual with invitation or right of access to web page 424, or alternatively, to persons of the public. The act of selection by the recipient may correspond to the recipient selecting the link, or a representation of it, using a browser, media player, messaging program or other application. The selection action may be, for example, a "mouse-click" or equivalent (voice command, touch command, hover and focus etc.).

In response to receiving a communication corresponding to a link selection action 470, the media delivery system 455 transmits portions of the media file 411 (as identified by the particular link) to the target remote terminal 465 on which link 450 was selected. As described with, for example, an embodiment of FIG. 3, the media delivery system 455 may configure the delivered media 460 to accommodate capabilities and resources of the device 465.

By selection of link 450, remote terminal 465 may alternatively send the request 475 to a service 480 which has access to a user defined network (and to media file 411) and is able to communicate with the target remote terminal 465. The service 480 may then provide the media delivery 460 for the particular device. Such a delivery system is described in more detail in U.S. patent application Ser. No. 11/531,182, U.S. Pat. No. 8,787,164, which is incorporated by reference herein.

Regardless of whether link 450 enables remote terminal 465 to directly access the media file 411, or indirectly access media file 411 through service 480 or other intermediary, an embodiment provides that the media delivery system 465 configures the media delivery 460 for the various capabilities and characteristics of the remote terminal 465. As described elsewhere, these include configuring the media delivery 460 for the platform, media player, browser, device capabilities or type, DRM engine or other characteristics of the remote terminal 465.

According to an embodiment, system 400 may allow an individual to compose media file 411 (or its media) for a message or web-page. Media file 411 provides media file data 413 for media delivery 460 to the remote terminal 465 of the recipient. In one implementation, the media file 411 provides the data for a video message that is to be transmitted in an email. The media file 411 may also provide the data for a video message that is posted on web page 424 (e.g. which could be a blog site). In another implementation, media file 411 may be recorded or generated from any device capable of recording media files. For example, the media file 411 may include a recording made from a video camera, webcam, or a cell phone or PDA with media recording capabilities. Still further, the, media file 411 may be a pre-existing file, stored in media library 405 prior to the user forming an intent to generate link 450. Alternatively, the media file 411 may be stored on the recording device (e.g. cell phone or video camera) and transferred to media library 405 at a later time. For example, if an individual records a video message using a video camera, the video message may be stored on the video camera and then transferred to media library 405 once the recording is complete. If however, the individual recording the message used a device that has access to the media library 405, the message may be stored in media library 405 while the recording is made.

Web Media Publishing Features

As described above, system 400 enables a user to provide personalized web publishing of personal media, including of media recorded by the user or in the user's library. As also mentioned with an embodiment, user may publish media content from media file 411 by posting link 411 to the desired web location, such as on web page 424. In one embodiment, the media file 411 may be packaged or included with an embedded media player or "gadget" that is displayed or otherwise provided as an object or feature of the page 424 when the page is downloaded by users. Selection of the object or feature on remote terminal 465 causes the embedded media player to use the link to access the media file, and then to stream the media file to remote terminal 465. In one implementation, for example, the media player may be provided by a FLASH component.

As described with other embodiments, the link 450 may provide an indirect link to the media file 411. Thus, for example, in the case of the link being provided on web page 424, selection of the link may cause a browser of the remote terminal device 465 to send request 475 to the service 480. Service 480 may be provided, for example, in form of one or more servers that have their own domain (e.g. Internet site address). Furthermore, in one implementation, the service 480 has a separate and constant connection with one or more terminals of the system 400. Service 480 may identify, for example, the user terminal and media file 411 from the request. According to one or more embodiments, the service 480 may then either (i) retrieve media data 413 from the media file 411 that resides on the user system 400 (or terminal), and then stream or otherwise provide the media delivery 460 from the media data 413; or (ii) enable establishment of direct link between the user terminal and the remote terminal 465 of the recipient so that the user system or terminal provides the media delivery 460 (by streaming or otherwise).

As an alternative or addition, one or more embodiments provide for use of offsite storage 490 in connection with embodiments described. In particular with web publishing, embodiments recognize the potential that a user's media publishing may incur heavy traffic and numerous requests, and in such cases, the performance of the user's terminal to respond or even operate may be compromised. Accordingly, one or more embodiments contemplate that the media file 411 is transferred from the system 400 to the offsite storage 490. In one implementation, the offsite storage 490 may be part of service 480, and have particular use when media file 411 is used for web publishing. In such cases, the link 450 may identify the media file 411 independent of its location at either the system 400 or the storage 490. The request from remote terminal 465 may be directed to service 480, which then identifies the media file 411, and determines its location on the offsite storage 490. The service 480 may then retrieve the media data 413 from the media file 411 stored on the storage 490, rather than from the system 400. The service 480 may also perform the media delivery, by, for example, streaming the media delivery 460 to the remote terminal 465 using the media data 413.

In one embodiment, service 480 may use intelligence or code to determine automatically when the media file 411 should be moved from the system 400 to the offsite storage 490. For example, the service 480 may count the number of requests 475 for the particular media file, and when the count exceeds some criteria or threshold, the media file 411 may be copied and moved automatically. Subsequent requests 475 from other remote terminals 465 results in service 480 doing the retrieval from the offsite storage 490.

As another alternative or addition, embodiments recognize that some forms of remote terminal 465 (e.g. small form factor devices such as cell phones) may not be able to use embedded media players. An embodiment provides a tool or mechanism to automatically generate a bare or coded (but otherwise redundant) link on page 424 for directing a media player or web browser of such a device to use a local media player to access the media file 411, or alternatively, to retrieve the media player 411 needed for the playback.

Link Inclusion in and Selection from an Electronic Message

Figure 5A:
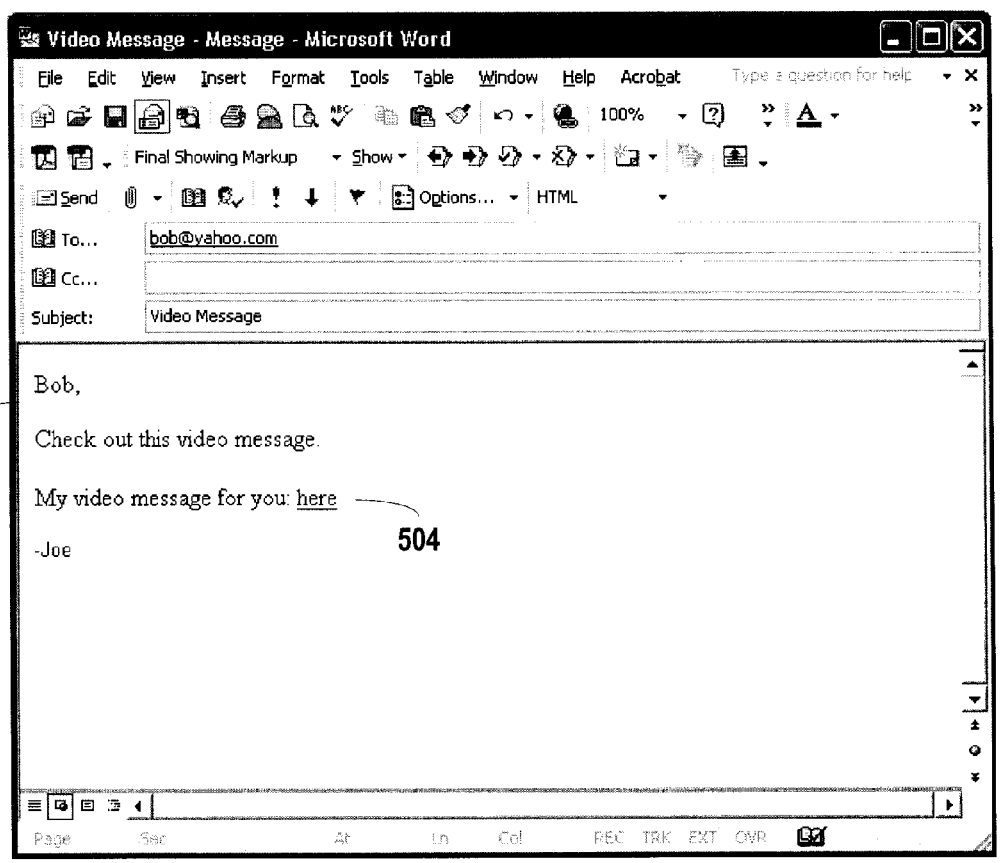
FIGS. 5A-5C illustrate a programmatically generated link for use in an email message, under an embodiment of the invention.

FIG. 5A illustrates a link that has been included in an electronic message according to an embodiment of the invention. As explained, an individual may use a third party messaging application 500 to compose a message 502. The individual composing the message may select or generate a media file to be included in the message. According to an embodiment, once the media file has been selected or generated, a link 504 is included in the body of the message 502. Once the link has been generated and included in the message, the individual may add or delete text in the message or send the message to the designated recipient(s).

Figure 5B:
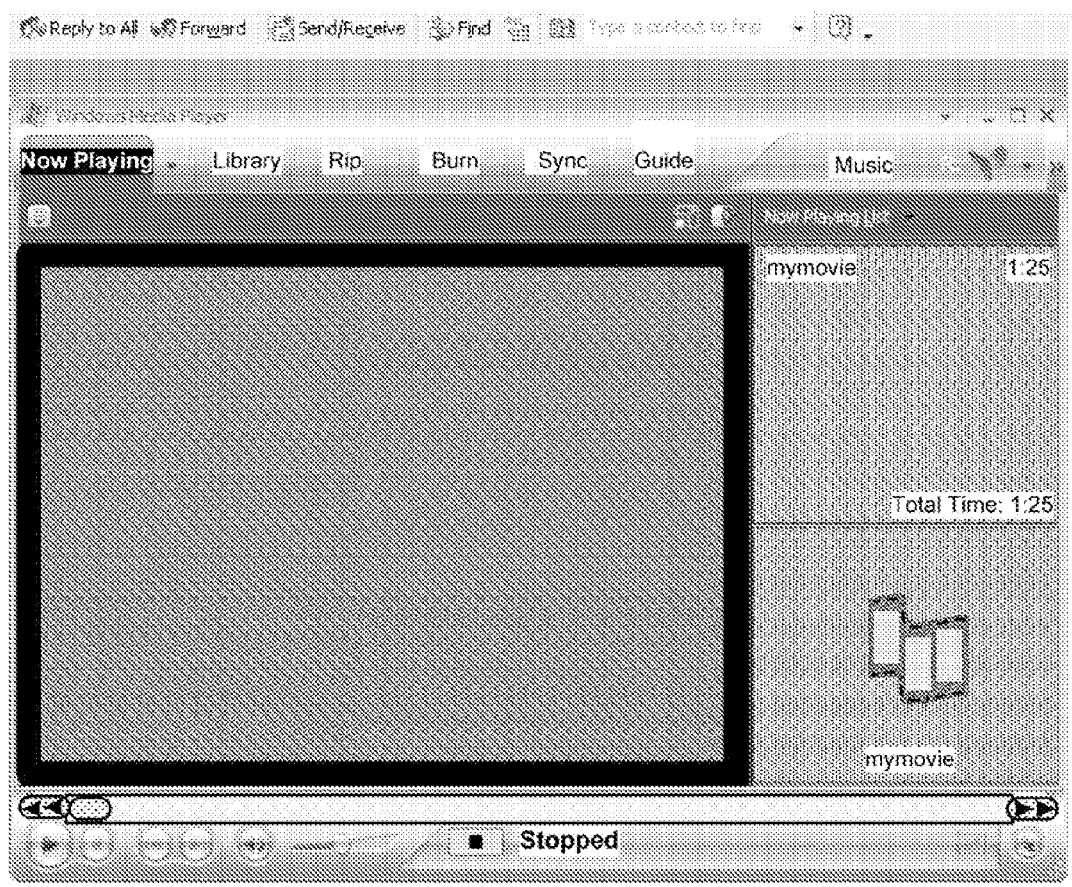

FIG. 5B illustrates opening a media player when the link 504 is selected by a recipient of the message. According to an embodiment, once link 504 has been selected by the recipient of the message, a media player, pre-installed on the target device, is automatically launched if the media player is not already running on the target device.

Figure 5C:
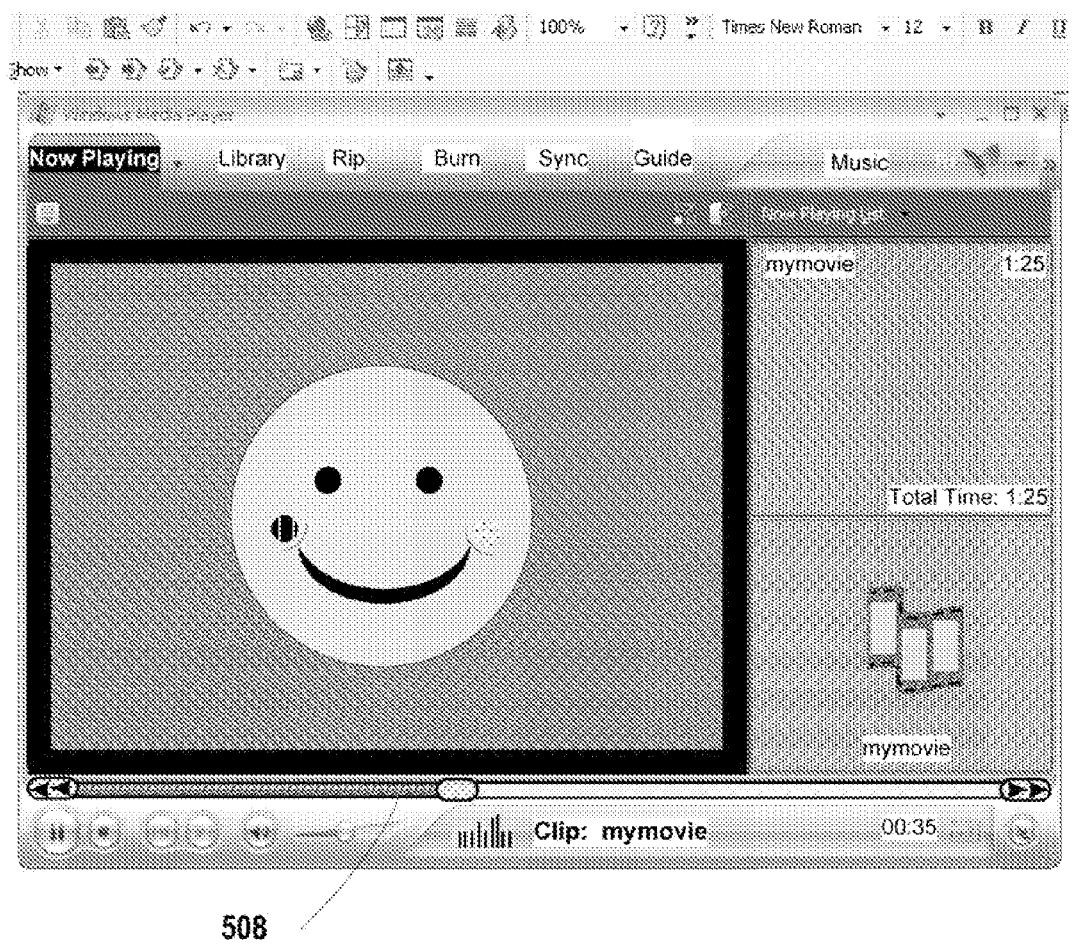

FIG. 5C shows a media file 508 being streamed to a media player on a target device. When a recipient of the message selects the link 504, the media file that was selected or generated by the composer of the message is streamed to the media player of the target device. In the example shown, the video media of the person's face is represented by the cartoon depiction of the smiley face. As explained above, if necessary, the media file being streamed to the target device is formatted to be compatible with the media player on the target device.

Figure 6:
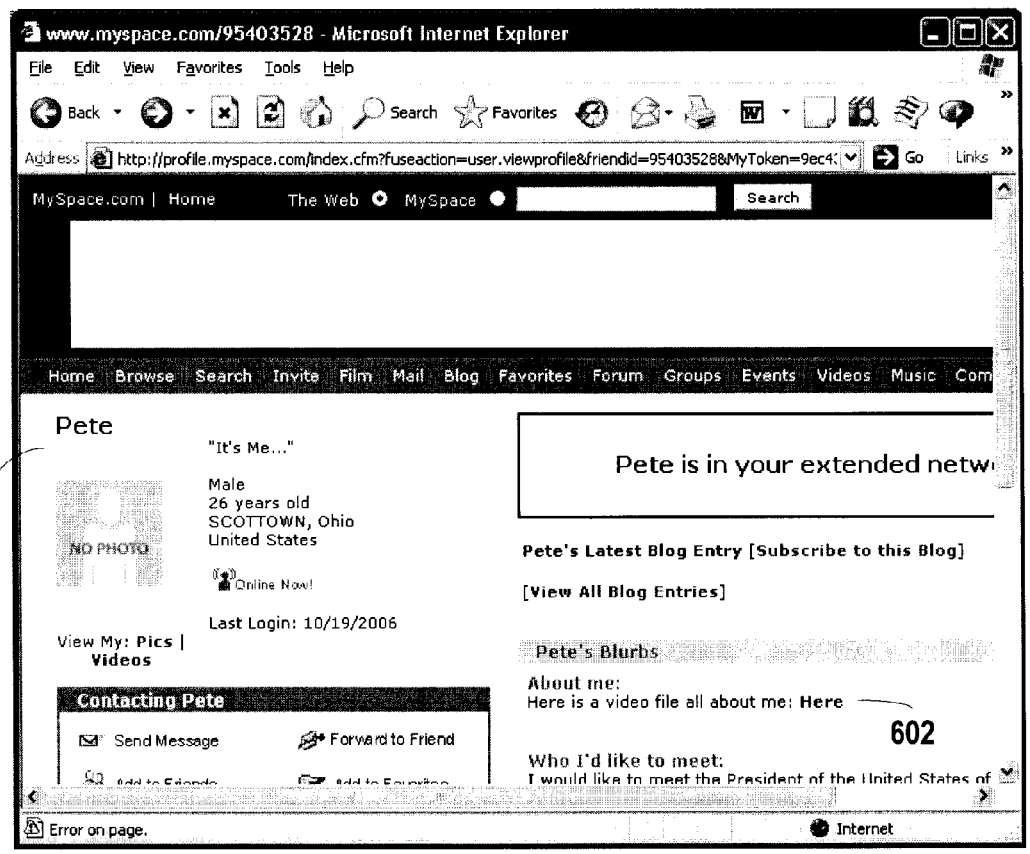
FIG. 6 illustrates a selectable link included on a web blog, under an embodiment of the invention.

FIG. 6 illustrates a selectable link being posted on a web log. According to an embodiment, a link may be automatically generated to be included on a web-page or web log (blog) site 600. In such a case, an individual may create or select a media file specifically for a particular blog posting 604. Once the media file has been selected or generated, a selectable link 602 enabling an individual to access the media file is generated and included on the blog posting 604. For example, an individual may create a profile for a blog site (e.g. myspace page) and create a media file (e.g. video message or greeting) specifically for that profile. Once the media file has been generated or selected, a link identifying that media file is included on the page. Selection of the link will stream the media file to the device on which the link was selected.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for electronically communicating a media file, the method comprising:

interconnecting a plurality of devices of a user to form a personal network, each of the plurality of devices being interconnected to one or more other devices of the personal network across one or more networks;

generating a link for an electronic communication that is composed or communicated from a given terminal of the personal network, wherein the link identifies a media file that is stored on a resource of the user's personal network that is remote to the given terminal;

detecting selection of the link from a remote terminal that is a recipient of the electronic communication;

upon detecting selection of the link from the remote terminal, detecting, one or more capabilities of the remote terminal to receive streaming media from the given terminal, then in response to selection of from the remote terminal, streaming data of the media file to the recipient, wherein streaming said data includes configuring transmission of the data to accommodate the detected one or more capabilities, including to accommodate a network bandwidth of the remote terminal to receive the streaming media file.

2. The method of claim 1, wherein generating the link is performed automatically after either (i) the media file identified by the link is recorded by the user, or (ii) recording of the media file identified by the link is initiated.

3. The method of claim 1, wherein detecting selection of the link from a remote terminal includes receiving a communication from an intermediate server or service that indicates the link was selected on the remote terminal.

4. The method of claim 3, wherein generating a link for an electronic communication includes generating a Uniform Resource Locator (URL) or partial URL.

5. The method of claim 1, wherein generating a link for an electronic communication includes generating a link for a message or a web posting.

6. The method of claim 1, wherein generating a link for an electronic communication includes generating a link for one of a Short Message Service (SMS), Multimedia Message service (MMS), or Instant Message (IM).

7. The method of claim 1, further comprising recording the media file to reflect a live event in presence of the user, and generating the link programmatically for the electronic communication in response to the completing or initiating recording of the live event.

8. The method of claim 1, wherein the media file resides on a second device on the personal network that is different than the given terminal.

9. The method of claim 1, wherein configuring transmission of the data to accommodate the detected one or more capabilities includes formatting the data for streaming based on one or more of (i) a type of platform used on the remote terminal, (ii) a type of browser or media player used on the remote terminal, or (iii) a display size of the remote terminal.

10. The method of claim 1, wherein generating a link for an electronic communication includes generating the link for insertion into a web page.

11. The method of claim 10, wherein generating the link includes embedding a media player with the link on the web page.

12. The method of claim 11, further comprising generating a second link that is not included with the media player, and provided for devices that are not equipped for using embedded media players.

13. The method of claim 1, further comprising enabling the link to be generated for any given media file stored on any of the plurality of devices that form the personal network.

14. The method of claim 1, wherein streaming data of the media file to the recipient is performed from the given terminal on which the communication is composed or communicated.

* * * * *